(12) United States Patent
Schriefer

(10) Patent No.: US 12,719,981 B1
(45) Date of Patent: Aug. 25, 2026

(54) MOBILE TELEPHONE MANAGEMENT SYSTEM AND METHOD

(71) Applicant: Tavis Dion Schriefer, Frisco, TX (US)

(72) Inventor: Tavis Dion Schriefer, Frisco, TX (US)

( * ) Notice: Subject to any disclaimer, the term of this patent is extended or adjusted under 35 U.S.C. 154(b) by 761 days.

(21) Appl. No.: 18/111,443

(22) Filed: Feb. 17, 2023

Related U.S. Application Data

(60) Provisional application No. 63/318,747, filed on Mar. 10, 2022.

(51) Int. Cl.
*H04M 1/72475* (2021.01)
*H04L 67/125* (2022.01)

(52) U.S. Cl.
CPC ...... *H04M 1/72475* (2021.01); *H04L 67/125* (2013.01)

(58) Field of Classification Search
CPC ......... H04M 1/72475; H04M 1/72463; H04M 1/724631; H04L 67/125
See application file for complete search history.

(56) References Cited

U.S. PATENT DOCUMENTS 9,686,392 B2 6/2017 Schriefer
10,425,518 B2 9/2019 Schriefer
2008/0201429 A1* 8/2008 Barbell ................ G06Q 10/109 709/205
2008/0218309 A1* 9/2008 Steenstra ............. H04W 8/245 340/5.8
2014/0187292 A1* 7/2014 Poole .................... H04M 1/667 455/564
2014/0194083 A1* 7/2014 Aldossary ........... H04M 1/2747 455/404.1
2015/0215753 A1* 7/2015 Leipzig ................... H04W 8/22 455/419
2016/0360034 A1* 12/2016 Engelke .................. G06F 3/165
2017/0005958 A1* 1/2017 Frenkel ................. G01S 5/0242
2017/0213191 A1* 7/2017 Pitcher ................... G16H 40/20
2018/0109988 A1* 4/2018 Clark .................. H04M 1/2725
2020/0382637 A1* 12/2020 Cranfill ................... H04M 3/16

* cited by examiner

*Primary Examiner* — Angelica Perez
(74) *Attorney, Agent, or Firm* — QuickPatents; Kevin Prince

(57) ABSTRACT

A system for a caregiver to manage the operation of a cellular phone of an impaired user includes a server connected with a network. The caregiver utilizes a caregiver terminal connected with the network to communicate with the server, executing a caregiver monitoring application that is connected with the server and that allows the caregiver to change operating parameters, update database lists and records, and the like, for the user. A separate software application resident in user's cellular phone is executed to communicate with the server over the network, and to manage the user interface and the display of the user's cellular phone. The application simplifies the display and the user interface of the cellular phone, offering only a few choices for the user, such as making or receiving a phone call, sending or receiving a text message, indicating an emergency, or the like.

23 Claims, 5 Drawing Sheets

30

Caregiver

| Caregiver ID | Caregiver Name | Subscription Level | Status | Expires |
|---|---|---|---|---|
| ... | ... | ... | ... | ... |
| 20834234 | Sally Doowell | Elite | Active | 3/31/2024 |
| 20834235 | Jimmy Compadre | Standard | Active | 8/30/2026 |
| 20834236 | Frank Friend | Elite | Expired | 12/31/2021 |
| ... | ... | ... | ... | ... |
| | | | | |

FIG. 3

User 20

40

| User ID | User Name | Caregiver | Address | Mobile Phone | Email |
|---|---|---|---|---|---|
| ⋮ | ⋮ | ⋮ | ⋮ | ⋮ | ⋮ |
| 1001 | Billy Bob | 20834234 | 6671 Ione St., Hellen, OH 43733 | 208-555-1234 | billy@gmail.com |
| 1002 | Sue Ellen Lee | 20834238 | 1277 1st St., Mainville, MA 00212 | 314-555-8374 | sue@hotmail.com |
| 1003 | Margaret Jones | 20834215 | 97 East Ridge Lane, Tucson, AZ 85433 | 916-555-1433 | mjones@mjonesmagic.com |
| 1004 | Myrna Smith | 20834965 | 37 S Rhodes Drive, Sequim, WA 98994 | 206-555-2026 | msmith@yahoo.com |
| ⋮ | ⋮ | ⋮ | ⋮ | ⋮ | ⋮ |

90 100 110 140 130

| Call Hours | Call Days | Text Hours | Text Days | Calls/hr | FWD # | Geo Restrict |
|---|---|---|---|---|---|---|
| ⋮ | ⋮ | ⋮ | ⋮ | ⋮ | ⋮ | ⋮ |
| XXXXXXX-----------XXXXX | MTWTFSS | XXXXXXX-----------XXXXX | MTWTFSS | 3 | 208-555-1400 | Home |
| XXXXXX-------------XXXX | MTWTFSS | XXXXXX-------------XXXX | MTWTFSS | 3 | 314-555-8000 | 5 miles |
| XXXXXXXX-----XX---XXXXXX | MT_TFSS | XXXXXXXX-----XX---XXXXXX | MTWTFSS | 2 | 916-555-1400 | 1 mile |
| XXXXXXX-----------XXXXX | MTWTFS_ | XXXXXXX-----------XXXXX | MTWTFSS | | 206-555-2000 | Home |
| ⋮ | ⋮ | ⋮ | ⋮ | ⋮ | ⋮ | ⋮ |

Contact Lists 80, 81, 83, 150

| User | Contact No. | Contact Name | Image File | Date Added | Date Added | Emergency Call |
|---|---|---|---|---|---|---|
| ⋮ | ⋮ | ⋮ | ⋮ | ⋮ | ⋮ | ⋮ |
| 1001 | 10013433 | Bill | AX244K309D8F.jpg | 11/15/2020 | 11/15/2020 | XX_X |
| 1001 | 10013434 | Sue | B2KKRKKKJ3K4.jpg | 1/27/2021 | 1/27/2021 | __X_ |
| 1001 | 10013435 | John T. | SOWOOR443O.jpg | 1/27/2021 | 1/27/2021 | XXXX |
| 1002 | 10023400 | Casey | HWH41H1H14H.jpg | 4/15/2017 | 4/15/2017 | XXXX |
| ⋮ | ⋮ | ⋮ | ⋮ | ⋮ | ⋮ | ⋮ |

FIG. 5

Transcripts 165, 160

| Call ID | Type | User | Contact | Call Time | Call Length | Transcript File | Audio File |
|---|---|---|---|---|---|---|---|
| ⋮ | ⋮ | ⋮ | ⋮ | ⋮ | ⋮ | ⋮ | ⋮ |
| 10040320 | Call | 1001 | 10013433 | 8/11/16 20:14 | 2:30 | HWH41H144H.txt | 12445.mp4 |
| 10040321 | Call | 1001 | 10013434 | 8/11/16 20:15 | 1:15 | B2KRR4099022.txt | 18774.mp4 |
| 10040322 | Text | 1002 | 10344990 | 9/14/16 12:37 | :45 | S588Z490XK15.text | 28144.mp4 |
| 10040323 | Call | 1008 | 12220394 | 10/16/16 1:27 | 15:50 | HW4WW14773.txt | 41449.mp4 |
| ⋮ | ⋮ | ⋮ | ⋮ | ⋮ | ⋮ | ⋮ | ⋮ |

FIG. 6

MOBILE TELEPHONE MANAGEMENT SYSTEM AND METHOD

CROSS-REFERENCE TO RELATED APPLICATIONS

This application claims the benefit of U.S. Provisional Patent Application 63/318,747, filed on Mar. 10, 2022, and is incorporated herein by reference.

STATEMENT REGARDING FEDERALLY SPONSORED RESEARCH AND DEVELOPMENT

Not Applicable.

FIELD OF THE INVENTION

This invention relates to telephone systems, and more particularly to a system for allowing a caregiver to manage an impaired person's phone capabilities, display style, and call lists.

BACKGROUND

New technologies afford new opportunities to make lives easier, and one of the most prominent areas of improving lives is through mobile phone technologies. Hundreds of millions of people now routinely communicate with others and educate and entertain themselves with their mobiles phones. Yet, a significant portion of the population, such as some elderly, autistic, or otherwise mentally handicapped individuals, find it difficult to use such new technologies. Such impaired individuals often cannot make sense of the many options provided with today's smart phones, and the wide selection of software applications (apps) and features become overwhelming.

Therefore, there is a need for a system that allows one or more caregivers to manage the options available on an impaired user's cellular phone. Such a needed invention would manage the person's authorized contacts for calling and texting, and would provide a prominent photo or image to such dialing or texting options. Such a needed system would allow caregivers to be remote from the impaired person, and to monitor calling, texting, and other activities. The needed invention would make using the cellular phone easy for the user, while still providing the user with access to many of the benefits of modern cellular phone technologies, such as GPS/geolocation, motion or orientation sensing for fall detection or other emergency situation detection, and of course wireless voice or text communication. The present invention accomplishes these objectives.

SUMMARY OF THE INVENTION

The present device is a system for one or more caregivers to manage over a network the operation of a cellular phone of a user. The network may be the Internet, a cellular or phone network, or other connection between a caregiver terminal and the user's cellular phone. Phone calls and text messages (so-called SMS messages for example) to and from the user's cellular phone utilize the cellular network, such as PLMN, VoIP-SIP, PSTN, or the like.

A server is connected with the network and includes at least a processor, a non-volatile memory, a database module, and a communication module. The server acts as a conduit for providing instructions from the one or more caregivers to the user's cellular phone. The server may be in a physical location, or in a virtual cloud location, as is known in the art.

Each caregiver utilizes a caregiver terminal connected with the network and adapted to communicate with the server over the network. Such a caregiver terminal may be a cellular phone, a desktop or laptop computer, a kiosk, a tablet computer, or other electronic terminal adapted to run a web application, or the like, running on the server, or on a locally-installed application. The caregiver terminal may execute a caregiver monitoring application that is connected with the server and allows the caregiver to change certain operating parameters, update database lists and records, and the like, for the user. Preferably each caregiver may be provided access to one or more of the users, and multiple caregivers may be assigned to any one particular user, depending on the needs of the users and the number and skill set of each caregiver.

A separate software application resident in the non-volatile memory of the user's cellular phone can be executed on the cellular phone to communicate with the server over the network, and to manage the user interface and the display of the user's cellular phone. The application simplifies the display and the user interface of the cellular phone, limiting the number of choices or features for the user, such as making or receiving a phone call, sending or receiving a text message, or the like.

Each caregiver can communicate with one of the caregiver terminals through the network with the application on the user's cellular phone via the server to manage the user interface and the display of the user's cellular phone. When the application starts, such as upon restart of the cellular phone, and from time to time when the application is running, the application communicates with the server to ascertain if any of its operating parameters have changed. If so, such changes are downloaded into the non-volatile memory of the cellular phone for use by the application.

In preferred embodiments, the application manages the placing of phone calls on the user's cellular phone, and the receiving of phone calls by the user's cellular phone. Each caregiver can establish at least one authorized phone list that includes one or more contact names, associated phone numbers, and preferably an image file for each contact. The application limits the phone numbers that can be dialed by the user's cellular phone, and the phone numbers that can be answered by the user's cellular phone, to only those on the at least one authorized phone number list. When the application is running on the user's cellular phone, the image file associated with the phone number present to call or that is calling is displayed on the display, for easier recognition by the user. The same method can be used for managing text messaging, and the authorized phone list may include permissions for each authorized contact for either phone calls, text messages, or both. Alternate embodiments also allow for a dial pad to be displayed for manually entering and dialing a phone number.

In some embodiments, each caregiver can establish time rules for providing a calling window for placing or receiving calls, indicated by time and day of the week, and a texting window for sending or receiving text messages. Preferably each caregiver can establish a maximum frequency of calls or text messages that can be sent to or received from a given contact in the authorized phone list.

In some embodiments, outside of the calling window and the texting window, calls and texts received may be forwarded to a third party, such as one of the caregivers, or to the server through VOIP for leaving a voice mail, for example. In some embodiments the calls or texts may be forwarded to the third party if the user is not at home, for example, as determined by the geolocation data for receiving calls from any particular authorized contact, and a geolocation module of the user's cellular phone if so equipped. In some embodiments, the user may only call one of the caregivers if the user is away from his home location, or away from a known safe location.

Preferably the system is adapted to detect emergency events. For example, if the user falls, based on the orientation module and/or the acceleration module of the user's cellular phone, the system may determine that the user has had a falling event. If the geolocation module of the user's cellular phone determines that the user has strayed away from his home location for longer than a predetermined maximum away time, such as two hours, then the system may determine that the user has had a wandering emergency. Similarly, if the orientation module and/or the acceleration module of the user's cellular phone have detected no movement for more than predetermined period of time, such as hours, then a movement emergency may be detected by the system. The user May overtly establish an emergency condition by actuating an emergency alert function of the application, such as by pressing an "Emergency 911" button on the user interface of the cellular phone for more than, for example, two or three seconds, or by dialing 911 on the dial pad, for example.

The present invention is a system that allows one or more caregivers to manage the options available on an impaired user's cellular phone. The present invention manages the person's authorized contacts for calling and texting, and provides a prominent photo or image to such dialing or texting options for easier recognition of contacts. The present system allows caregivers to be remote from the impaired person, and to monitor calling, texting, and other activities for safety. The present system makes using the cellular phone easier for the user, while still providing the user with access to many of the benefits of modern cellular phone technologies, such as GPS/geolocation, motion or orientation sensing for fall detection or other emergency situation detection, and of course wireless voice or text communication. Other features and advantages of the present invention will become apparent from the following more detailed description, taken in conjunction with the accompanying drawings, which illustrate, by way of example, the principles of the invention.

DESCRIPTION OF THE DRAWINGS

FIG. 3 is a truncated database table for caregivers of the system;

FIG. 4 is a truncated database table for users of the system;

FIG. 5 is a truncated database table for contact lists of the system; and

FIG. 6 is a truncated database table for transcripts of the system.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
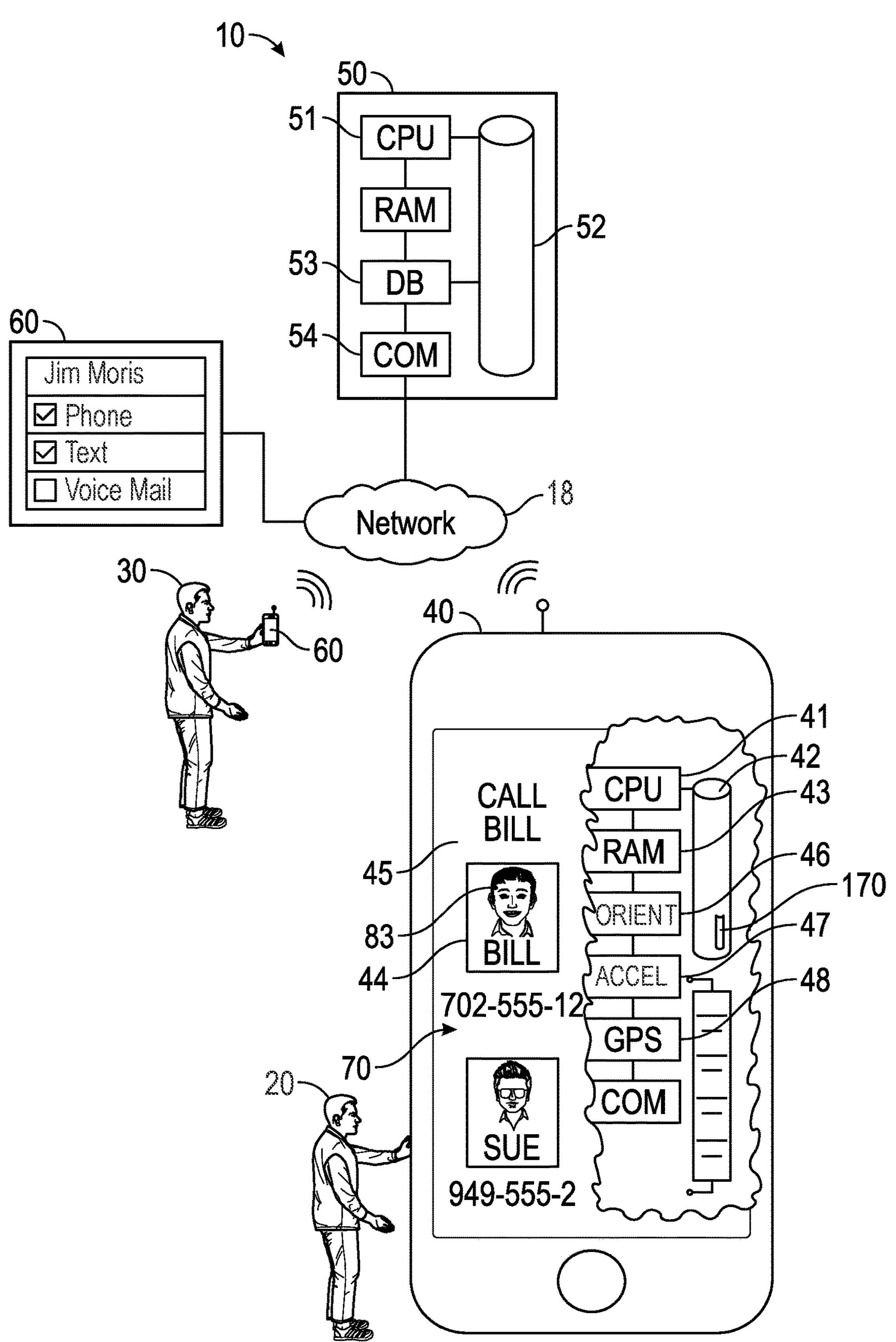
FIG. 1 is a system diagram of the invention.
Figure 2:
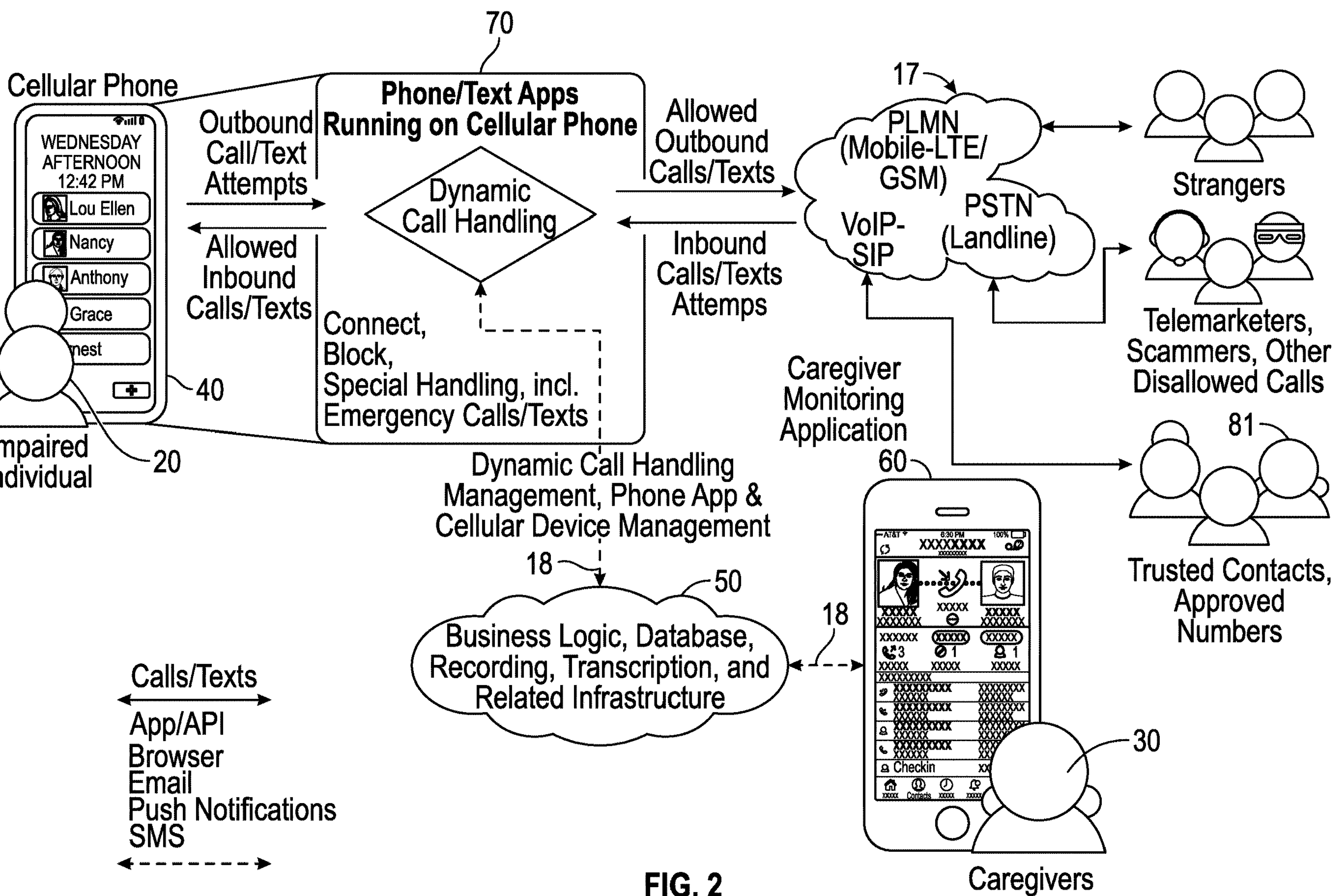
FIG. 2 is an alternate system diagram of the invention, illustrating a phone network.

FIGS. 1-6 illustrate a system 10 for one or more caregivers 30 to manage over a network the operation of a cellular phone 40 of a user 20. The cellular phone 40 may include a so-called feature phone, a flip phone, or a so-called smart phone, any of which include a processor 41, a non-volatile memory 42, a volatile memory 43, a user interface 44, and a display 45. Some cellular phones 40 may further include an orientation module 46, an acceleration module 47, and/or a geolocation module 48. The network 18 may be the Internet, a cellular or phone network 17, or other connection between a caregiver terminal 60 and the user's cellular phone 40. Phone calls and text messages (so-called SMS messages for example) to and from the user's cellular phone 40 utilize the cellular network 17, such as PLMN, VoIP-SIP, PSTN, local WiFi networks, or local Bluetooth networks, or the like.

A server 50 is connected with the network 18 and includes at least a processor 51, a non-volatile memory 52, a database module 53, and a communication module 54. The server acts as a conduit for providing instructions from the one or more caregivers 30 to the user's cellular phone 40. The server 50 may be in a physical location (FIG. 1), or in a virtual cloud location (FIG. 2), as is known in the art.

Each caregiver 30 utilizes a caregiver terminal 60 connected with the network 18 and adapted to communicate with the server 50 over the network 18. Such a caregiver 11 terminal 60 may be a cellular phone, a desktop or laptop computer, a kiosk, a tablet computer, or the like. The caregiver terminal 60 may also include other electronic terminals adapted to run a web application executing on the server 50, for example. Suitable password, biometric, or other security means are provided to ensure the caregivers 30 accessing a particular user's cellular phone 40 are authorized, as is known in the art. The caregiver terminal 60 may execute a caregiver monitoring application that is connected with the server 50, either locally or through the network 18, and allows the caregiver 30 to change certain operating parameters, update database lists and records, and the like. Preferably each caregiver 30 may be provided access to one or more of the users 20, and multiple caregivers 30 may be assigned to any one particular user 20, depending on the needs of the users 20 and the number and skill set of each caregiver 30. Each caregiver 30 may have an appropriate permission level, such that some caregivers can only view information on the server 50, while other caregivers 30 are able to view and edit such information. An administrative level caregiver 30 is able to add or remove caregivers 30 from any particular user's account, and assign permissions to such caregivers 30.

A separate software application 70 resident in the non-volatile memory 42 of the user's cellular phone 40 can be executed on the cellular phone 40 to communicate with the server 50 over the network 18, and to manage the user interface 44 and the display 45 of the user's cellular phone 40. The application 70 simplifies the display 45 and the user interface 44 of the cellular phone 40, limiting the choices for the user 20, such as to just making or receiving a phone call, just sending or receiving a text message, or the like. The caregiver 30 may determine, for example, that text messaging is too confusing for a given user 20, and then delete text messaging as an available function on the user's cellular phone 40. Preferably the application 70 is set to run upon restarting of the cellular phone 40, so that the application 70 is always running when the cellular phone 40 is on. In one embodiment the application 70 may be terminated or minimized with a hidden command, such as pressing two corners of the user interface 44 simultaneously for three seconds or more, or the like. As such, the application 70 is difficult to close by accident.

Each caregiver 30 can communicate with one of the caregiver terminals 60 through the network 18 with the application 70 on the user's cellular phone 40 via the server 50 to manage the user interface 44 and the display 45 of the user's cellular phone 40. When the application 70 starts, such as upon restart of the cellular phone, and from time to time when the application 70 is running, the application 70 communicates with the server 50 to ascertain if any of its operating parameters have changed. If so, such changes are downloaded into the non-volatile memory 42 of the cellular phone 40 for use by the application 70.

In preferred embodiments, the application 70 works in conjunction with server 50 to manage the placing of phone calls on the user's cellular phone 40, and the receiving of phone calls by the user's cellular phone 40. Each caregiver 30 can establish at least one authorized phone list 80 (FIG. 5) that includes one or more contact 81 names, associated phone numbers, and preferably an image file 83 for each contact 81. The at least one authorized phone list 80 is stored on the server 50 and a copy is downloaded into a cache 170 in the non-volatile memory 42 of the user's cellular phone 40 by the application 70. The application 70 checks with the server 50 during a calling event (such as making an outbound call from the cellular phone 40, or receiving a call on the cellular phone 40), to determine if the phone number of the call is an authorized phone number in the 16 authorized phone list 80. If the server 50 cannot be reached timely, the application 70 utilizes the cached version 170 of the phone list 80 stored on the user's cellular phone 40.

The application 70 limits the phone numbers that can be dialed by the user's cellular phone 40, and the phone numbers that can be answered by the user's cellular phone 40, to only those on the at least one authorized phone number list 80. In some embodiments the application 70 may allow certain contacts 81 to be called by the user's cellular phone 40, while preventing those same contacts 81 from calling the user's cellular phone 40, or vice versa. When the application 70 is running on the user's cellular phone 40, the image file 83 associated with the phone number present to call or that is calling is displayed on the display 45 (FIG. 1), for easier recognition by the user 20, as a "speed dial" button, for example. The same method can be used for managing text messaging, and the authorized phone list 80 may include permissions for each authorized contact 81 for either phone calls, text messages, or both.

Preferably audio recordings 160 of any phone calls, or transcriptions 165 of such phone calls produced by either the application 70 or the server 50, are stored by the database module 53 of the server 50 in the non-volatile memory 52. As such, any of the caregivers 30, or in some embodiments only those caregivers 30 with appropriate permissions, can access the transcripts 165 by date and time or contact 81. Similarly, text messages received by or sent from the user's cellular phone 40 may also be stored by the server 50 for future access by one of the caregivers 30.

In some embodiments, each caregiver 30 can establish time rules 120 for providing a calling window 90 for placing or receiving calls, indicated by time and day of the week (FIG. 4), and a texting window 100 for sending or receiving text messages. For example, the time rules 120 may establish a calling window 90 of between 8 am and 8 pm daily, and a texting window 100 of between 7 am and 9 pm but only on weekdays.

Preferably each caregiver 30 can establish a maximum frequency of calls or text messages that can occur between user 20 and a given contact 81 in the authorized phone list 80. For example, such a maximum frequency of calls may be three per day, or up to twenty text messages per day per contact 81.

In some embodiments, outside of the calling window 90 and the texting window 100, calls and texts received may be forwarded to a third party, such as one of the caregivers 30. In some embodiments the calls or texts may be forwarded to the third party, or to the server 50, if the user 20 is not at home, for example, as determined by the geolocation data 130 for receiving calls from any particular authorized contact 81, and the geolocation module 48 of the user's cellular phone 40 if so equipped. In some embodiments, the user 20 may only call one of the caregivers 30 if the user 20 is away from his home location, or away from a known safe location.

Preferably the system 10 is adapted to detect emergency events. For example, if the user 20 falls, based on the orientation module 46 and/or the acceleration module 47 of the user's cellular phone 40, the system 10 may determine that the user 20 has had a falling event. If the geolocation module 48 of the user's cellular phone 40 determines that the user 20 has strayed away from his home location for longer than a predetermined maximum away time, such as two hours, then the system 10 may determine that the user 20 has had a wandering emergency. Similarly, if the orientation module 46 and/or the acceleration module 47 of the user's cellular phone 40 have detected no movement for more than predetermined period of time, such as 16 hours, then a movement emergency may be detected by the system 10. The user 20 may overtly establish an emergency condition by actuating an emergency alert function of the application 70, such as by pressing an "Emergency 911" button on the user interface 44 of the cellular phone 40 for more than, for example, two or three seconds. Alternately a dial pad (not shown) may be displayed on the display 45, presenting a numerical user interface that the user 20 can use to manually dial a phone number. This feature can be enabled or disabled by the caregiver 30, as such a dial pad may be too complicated or confusing for some users 20.

In the case where an emergency event 150 has been detected, the system 10 can notify one or more of the caregivers 30 and/or the authorized contacts 81 in the authorized phone list 80 based on rules for each contact 81 and the type of emergency event 150 detected. For example, if a wandering emergency occurs, a contact 81 located proximate the user 20 may be called or text messaged to go and find the user 20 and to make sure the user 20 gets back to his home location.

Preferably the application 70 writes a cache 170 of common information that is requested from the server 50 to the non-volatile memory of the user's cellular phone 40. The application 70 uses the common information in the cache 170 when communication between the server 50 and the cellular phone 40 is down or degraded. The common information requested form the server may include the at least one authorized phone list 80, images 83 associated with each entity name 81, calling windows 90, time rules 120, texting windows 100, maximum frequency of calls to each contact 81, forwarding numbers, caregiver 30 contact information, emergency contact information, and the like.

In some embodiments, the system 10 may include a reminding function (not shown) to remind the user 20 to take medications, perform physical therapy or exercise, eat, or the like. The caregivers 30 can establish schedules for reminding the user 20 of such events, and the reminders can be text messages, phone calls, or both. In some embodiments, health checks can be initiated automatically by the system 10 based on a schedule set-up by one of the caregivers 30, such health checks requiring the user 20 to answer certain questions upon receiving a phone call, or to text an answered reply back in response to a text message health check. In some embodiments, such a health check questionnaire can be presented by the application 70 itself as prompted by the server 50, with all answers being sent back to the server 50 for review by the caregivers 30.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A system for one or more caregivers to manage over a network the operation of a user's cellular phone of the type having a processor, a non-volatile memory, a volatile memory, a user interface, a display, and an orientation module, the system comprising:

a server connected with the network and including at least a processor, a non-volatile memory, a database module, and a communications module;

one or more caregiver terminals connected with the network and adapted to communicate with the server over the network;

an application resident in the non-volatile memory of the user's cellular phone, the application adapted to communicate with the server over the network and to manage the user interface and display of the user's cellular phone, wherein the application detects emergency events via the orientation module of the user's cellular phone;

whereby each caregiver through one of the caregiver terminals can communicate through the network with the application on the user's cellular phone, via the server, to manage the user interface and display of the user's cellular phone.

2. The system of claim 1 wherein the non-volatile memory of the user's cellular phone includes a cache of common information requested by the user's cellular phone from the server, the application using the common information in the cache when communication between the server and the cellular phone is unavailable in a timely manner.

3. The system of claim 1 wherein the application resident on the user's cellular phone is adapted to manage certain phone call functions of the user's cellular phone, including placing calls and receiving calls, and to provide at least one authorized phone list that includes an entity name and an associated phone number, so as to limit phone numbers that can be dialed by the user's cellular phone and to limit the phone numbers that can be answered by the user's cellular phone to only those on the at least one authorized phone number list.

4. The system of claim 3 wherein the system associates an image with each entity name on the at least one authorized phone number list, the application when running on the user's cellular phone displaying the images associated with each entity name on the at least one authorized phone number list when presenting the user with a list of numbers to call, or when receiving a call by the phone number associated with the entity name.

5. The system of claim 3 wherein the application resident on the user's cellular phone is adapted to manage certain text messaging functions of the user's cellular phone, including sending and receiving text messages, so as to limit phone numbers that can be texted by the user's cellular phone and to limit the phone numbers that can send text messages to the user's cellular phone to only those on the at least one authorized phone number list.

6. The system of claim 5 wherein the system associates an image with each entity name on the at least one authorized phone number list, the application when running on the user's cellular phone displaying the images associated with each entity name on the at least one authorized phone number list when presenting the user with a list of numbers to text, or when receiving a text by the phone number associated with the entity name.

7. The system of claim 3 wherein the application resident on the user's cellular phone is adapted to manage certain phone call functions of the user's cellular phone, including times during the day or week when calls may be placed or received, and/or times during the day or week when texts may be sent or received.

8. The system of claim 3 wherein the application resident on the user's cellular phone is adapted to manage certain phone call functions of the user's cellular phone, including a frequency of calls that may be placed to, or received by, those on the at least one authorized phone number list.

9. The system of claim 3 wherein the user's cellular phone is further equipped with a geolocation module, and the application resident on the user's cellular phone is adapted to manage certain phone call functions of the user's cellular phone, including forwarding of calls or texts placed or received, based on time rules and/or geolocation data.

10. The system of claim 3 wherein the emergency events further comprise the user falling if the user's cellular phone is also equipped with an acceleration module, wandering outside of a geographic location, not moving for a predetermined period of time, and/or actuating an emergency alert function of the phone, the server adapted to contact predetermined third parties if such an emergency event is detected.

11. The system of claim 5 wherein the application resident on the user's cellular phone sends to the server audio recordings or transcriptions of phone calls occurring on the cellular phone, the server adapted to generate a transcript of each audio recording and then store such transcript in the non-volatile memory, or store a transcript generated by the application resident on the user's cellular phone in the non-volatile memory, each caregiver thereafter being able to access the transcripts through the network.

12. The system of claim 5 wherein the application resident on the user's cellular phone sends to the server text messages sent or received on the cellular phone, the server adapted to store text messages sent and received in the non-volatile memory, each caregiver thereafter being able to access the text messages through the network.

13. A method for one or more caregivers to manage over a network the operation of a user's cellular phone of the type having a processor, a non-volatile memory, a volatile memory, a user interface, a display, and an orientation module, the method comprising the steps:

connecting a server with the network that includes at least a processor, a non-volatile memory, a database module, and a communications module;

connecting one or more caregiver terminals with the network and adapting the one or more caregiver terminals to communicate with the server over the network;

communicating an application resident in the non-volatile memory of the user's cellular phone with the server over the network and managing the user interface and display of the user's cellular phone;

detecting, via the orientation module of the user's cellular phone, emergency events;

maintaining, via the one or more caregivers, at least one authorized phone list, wherein the at least one authorized phone list includes an entity name and an associated phone number;

limiting, via the application resident on the user's cellular phone, the phone numbers that can be dialed by the user's cellular phone to only those on the at least one authorized phone number list; and limiting, via the application resident on the user's cellular phone, the phone numbers that can be answered by the user's cellular phone to only those on the at least one authorized phone number list.

14. The method of claim 13 further including the steps:

the application when in communication with the server writing common information to a cache in the non-volatile memory; and the application utilizing the cache for the common information when communication between the cellular phone and the server is down.

15. The method of claim 13 further including the steps:

the one or more caregivers associating an image with each entity name on the at least one authorized phone number list; and the application when running on the user's cellular phone displaying the images associated with each entity name on the at least one authorized phone number list when either presenting the use with a list of numbers to call, or when receiving a call by the phone number associated with the entity name.

16. The method of claim 13 further including the step:

the application resident on the user's cellular phone limiting the phone numbers that can be texted by the user's cellular phone to only those on the at least one authorized phone number list; and the application resident on the user's cellular phone limiting the phone numbers from which a text message can be received to only those on the at least one authorized phone number list.

17. The method of claim 16 further including the steps:

the one or more caregivers associating an image with each entity name on the at least one authorized phone number list; and the application when running on the user's cellular phone displaying the images associated with each entity name on the at least one authorized phone number list when either presenting the use with a list of numbers to text, or when receiving a text by the phone number associated with the entity name.

18. The method of claim 13 further including the steps:

the one or more caregivers determining windows during days of the week or times of the day in which phone calls or texts are permitted;

the application resident on the user's cellular phone limiting the placing or receiving of phone calls to within the calling windows in accordance with a current day or time; and the application resident on the user's cellular phone limiting the sending or receiving of texts to within the texting windows in accordance with the current day or time.

19. The method of claim 13 further including the steps:

the one or more caregivers managing a maximum frequency of calls that may be placed to, or received by, those on the at least one authorized phone number list; and the application resident on the user's cellular phone limiting the number of calls that may be placed to, or received by, those on the at least one authorized phone number list, in accordance with the maximum frequency.

20. The method of claim 13 further including the steps:

the one or more caregivers managing forwarding rules of calls or texts, either placed or received, based on time rules and/or geolocation data from a geolocation module of the user's cellular phone; and the application resident on the user's cellular phone forwarding calls or texts placed or received in accordance to the forwarding rules.

21. The method of claim 13 further including the steps:

the one or more caregivers managing a predetermined geographic location and a minimum movement frequency;

the application resident on the user's cellular phone detecting the emergency events, including the user falling if the user's cellular phone is also equipped with an acceleration module, wandering outside of the predetermined geographic location, not moving within the minimum movement frequency, and/or actuating an emergency alert function of the phone;

the server contacting predetermined third parties when such an emergency event is detected.

22. The method of claim 13 further including the steps:

the application resident on the user's cellular phone sending to the server audio recordings or transcriptions of phone calls occurring on the user's cellular phone;

the server generating a transcript of the audio recording received;

the server storing the transcript in the non-volatile memory; and providing each caregiver through one of the caregiver terminals access to any of the transcripts through the network.

23. The method of claim 13 further including the steps:

the application resident on the user's cellular phone sending to the server text messages sent or received on the cellular phone;

the server storing text messages sent and received in the non-volatile memory; and providing each caregiver through one of the caregiver terminals access to any of the text messages through the network.

* * * * *